United States Patent [19]
Neely, Jr.

[11] Patent Number: 5,632,457
[45] Date of Patent: May 27, 1997

[54] ADJUSTABLE ROUTING CLAMP ASSEMBLY

[75] Inventor: Robert H. Neely, Jr., Fort Wayne, Ind.

[73] Assignee: Navistar International Transportation Corp., Chicago, Ill.

[21] Appl. No.: 354,405

[22] Filed: Dec. 12, 1994

[51] Int. Cl.⁶ .................................................... F16L 3/22
[52] U.S. Cl. .......................... 248/69; 24/16 PB; 248/74.3
[58] Field of Search ........................ 248/69, 68.1, 74.2, 248/74.1, 74.3, 49, 65, 73, 70; 24/16 PB

[56] References Cited

U.S. PATENT DOCUMENTS

| | | | |
|---|---|---|---|
| 3,463,427 | 8/1969 | Fisher | 248/68.1 |
| 3,674,233 | 7/1972 | Van Buren, Jr. | 248/68.1 |
| 3,923,277 | 12/1975 | Perrault et al. | 248/68.1 X |
| 4,473,524 | 9/1984 | Paradis | 24/16 PB X |
| 4,735,387 | 4/1988 | Hirano et al. | 248/74.3 X |
| 4,960,253 | 10/1990 | Perrault et al. | 248/68.1 |
| 5,083,346 | 1/1992 | Orton | 248/74.3 X |
| 5,112,013 | 5/1992 | Tolbert et al. | 248/74.3 |
| 5,188,319 | 2/1993 | Hawash et al. | 248/68.1 |
| 5,332,179 | 7/1994 | Kuffel et al. | 248/74.3 |

*Primary Examiner*—Ramon O. Ramirez
*Attorney, Agent, or Firm*—Dennis K. Sullivan

[57] ABSTRACT

An adjustable routing clamp assembly capable of accommodating engagement of various size or numbers of elongated members in a bundle, the clamp assembly including an extension element to be attached to a vehicle frame having a plurality of slots spaced thereon and a tie strap engaged to the extension at a first slot on one side of the bundle and disposed to wrap around the bundle and engage the extension at a second slot displaced from the first slot by the width of the bundle, thus clamping the bundle against the extension element, with a toothed keeper element used to maintain the strap in engagement with the bundle and extension element, thereby accommodating engagement of various size or numbers of elongated members in a bundle by using different slots along the extension element.

2 Claims, 3 Drawing Sheets

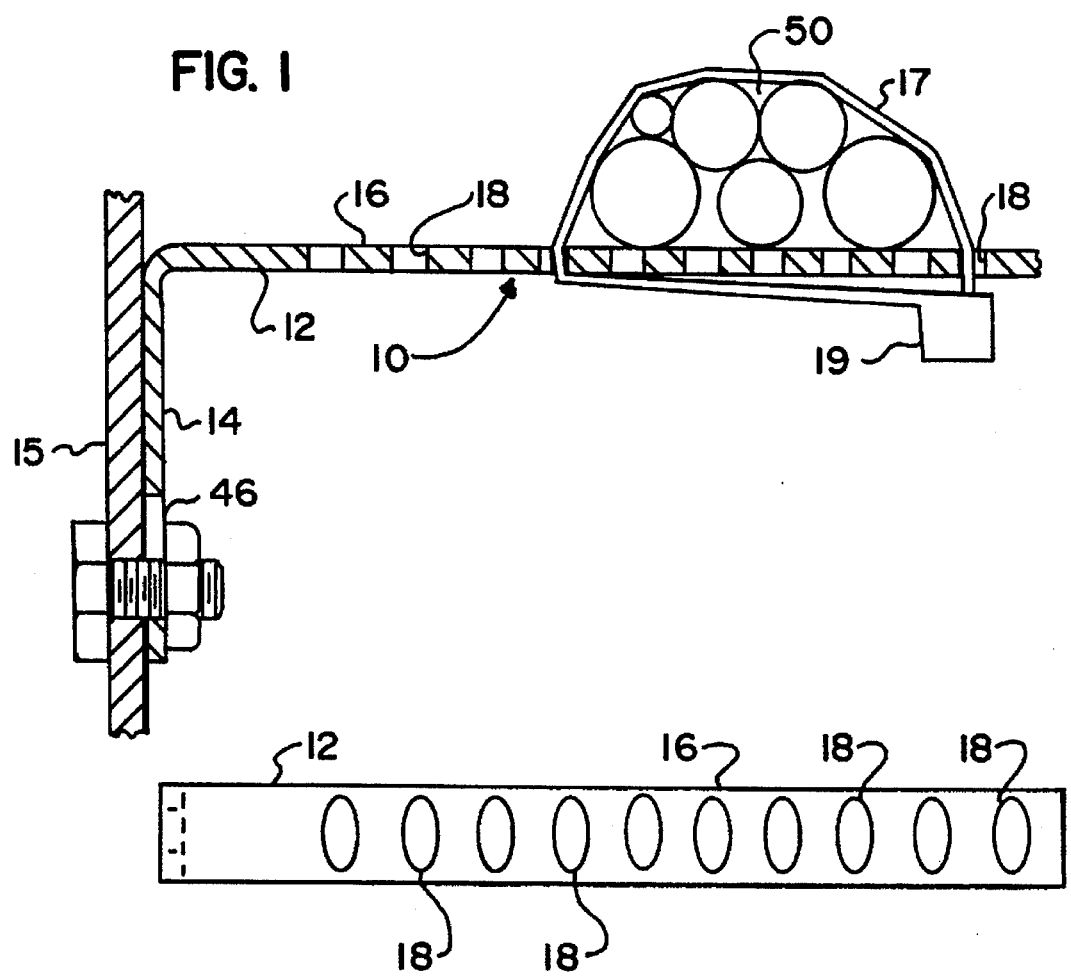
FIG. 1
FIG. 2
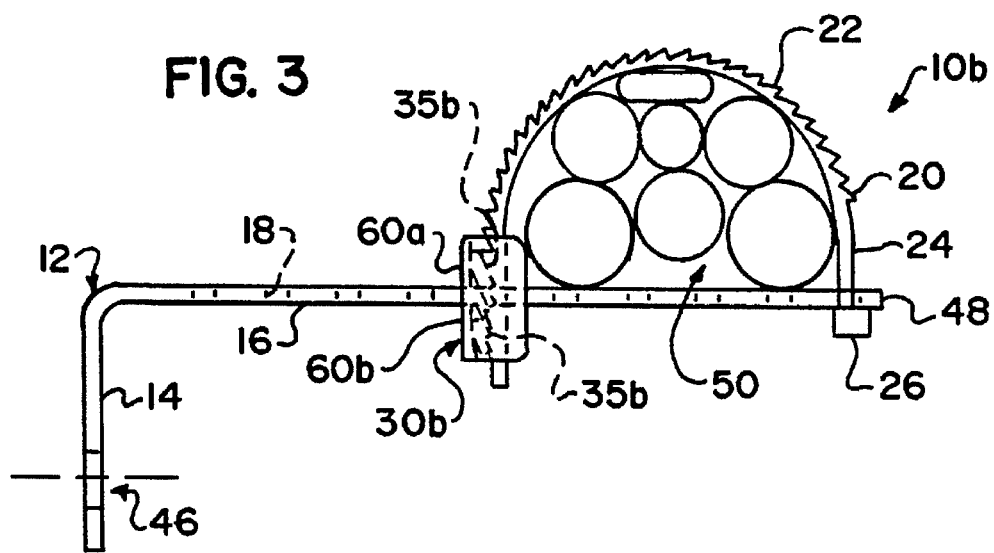
FIG. 3

ADJUSTABLE ROUTING CLAMP ASSEMBLY

BACKGROUND OF THE INVENTION

The present invention relates to an adjustable routing clamp assembly for use in trucks for retaining bundles of elongated members, such as wiring harnesses, air brake hoses, fuel hoses, etc., to the truck frame at various points therealong. More particularly, the routing clamp of the invention includes an extension element to be attached to the frame having a plurality of slots spaced thereon and a tie strap engaged to the extension at a first slot on one side of the bundle and disposed to wrap around the bundle and engage the extension at a second slot displaced from the first slot by the width of the bundle, with a toothed keeper element used to maintain the strap in engagement with the bundle and extension element, thereby providing an adjustable clamp assembly capable of accommodating engagement of various size bundles by using different slots along the extension element while providing a stable mounting of the bundle to the frame.

THE PRIOR ART

Heretofore, in the manufacture of trucks, routing clamps for elongated tubular members, such as air brake hoses and wiring harnesses, typically have been a clip extension attached to the frame to which a steel P-clamp, having a fixed diameter or shape for accommodating a particular tubular member, may be bolted. To route various size structures, and at varying distances from the frame depending on the application, a plurality of such specific P-clamps are utilized. Thus, several hundred clip extensions and clamps have had to be maintained in a costly inventory which also involves a significant amount of time in design and planning and inventory management. The problem is exacerbated in the manufacture of trucks due to the large variety of truck chassis which may be manufactured as well as special equipment provided thereon to meet specific customer requirements.

Others have used cable ties for attaching elongated elements to a vehicle frame. One such arrangement is shown in U.S. Pat. No. 5,112,013. However, the bundle is typically wrapped by the cable tie and the cable tie is attached to a single point on a support member and is thus more susceptible to twisting and pivoting of the bundle about the single point than if the bundle is secured at multiple points. Such instability is accentuated in a heavy duty truck environment due to the substantially larger mass of the various elements to be bundled. Especially due to the air brake hoses, a bundle on a heavy truck may weigh four to five pounds per foot and thus requires a more stable mounting.

The routing clamp assembly of the present invention wherein the bundle is tied directly to the clamp extension piece and is secured thereto at two points, i.e., on both sides of the bundle, provides a stable mounting for the bundle at least comparable to that achieved by a conventional metal P-clamp yet is highly adaptable to variations in the number and size of the elongated members to be clamped and thus reduces the inventory and the ancillary expenses associated therewith by requiring only one or two clamping arrangements and a few clip arrangements to be kept on hand.

SUMMARY OF THE INVENTION

Accordingly, it is a primary purpose of the routing clamp assembly of the present invention to provide a versatile structure for securing a variety of elongated members to a vehicle frame.

A further object of the invention is to provide a routing clamp assembly wherein the bundle is secured to the clamp assembly at at least two spaced points to provide a stable mounting.

Yet a further object of the invention is provide a routing clamp assembly wherein the bundle is secured by a strap against the frame-attached support member to provide a stronger mounting.

These and other objects are met by the adjustable routing clamp assembly of the present invention capable of accommodating engagement of various size or numbers of elongated members in a bundle, the clamp assembly including an extension element to be attached to a vehicle frame having a plurality of slots spaced thereon and a tie strap engaged to the extension at a first slot on one side of the bundle and disposed to wrap around the bundle and engage the extension at a second slot displaced from the first slot by the width of the bundle, thus clamping the bundle against the extension element, with a toothed keeper element used to maintain the strap in engagement with the bundle and extension element, thereby accommodating engagement of various size or numbers of elongated members in a bundle by using different slots along the extension element.

BRIEF DESCRIPTION OF THE DRAWINGS

Other objects and advantages of the invention will become more apparent upon perusal of the detailed description thereof and upon inspection of the drawings in which:

FIG. 1 is a side section view of a routing clamp assembly of the present invention mounted to a truck frame, showing the clamp assembly engaging a plurality of elongated members;

FIG. 2 is a top view of an extension element of the assembly of FIG. 1;

FIG. 3 is a side view of a first alternate embodiment of a routing clamp assembly of the present invention utilizing a plastic strap and a separate keeper mounted on the extension, showing same engaging a plurality of elongated members;

DESCRIPTION OF THE PREFERRED EMBODIMENT

Figure 4:
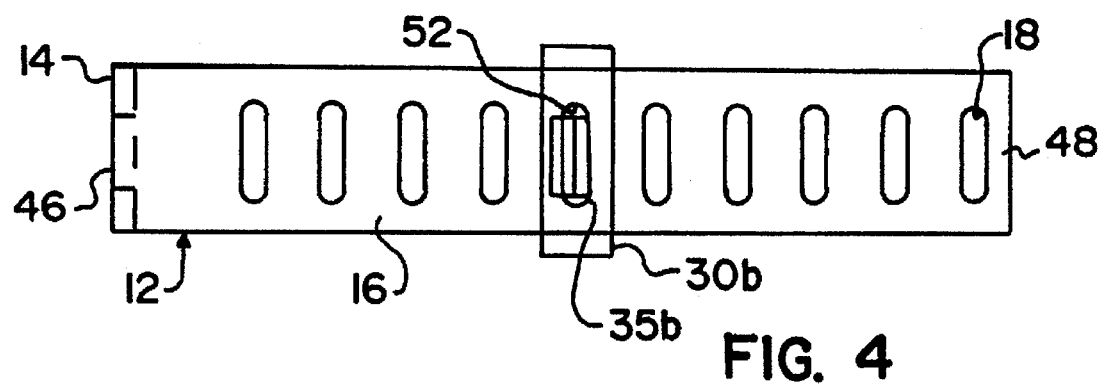
FIG. 4 is a top plan view of the assembly of FIG. 3.
Figure 6:
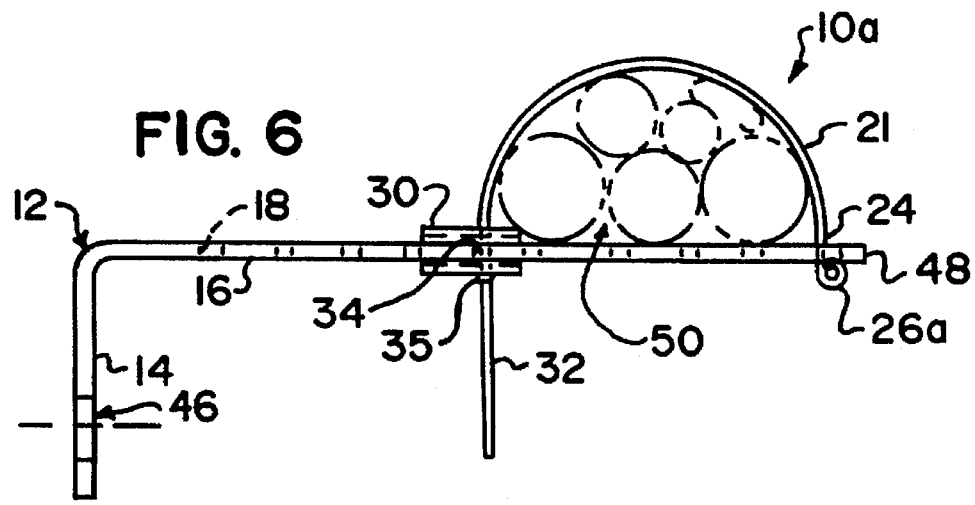
FIG. 6 is a side view of a second alternate embodiment of a routing clamp assembly of the present invention utilizing a metal strap and a separate keeper of the type shown in FIG. 9 mounted on the extension, showing same engaging a plurality of elongated members.

Referring now to the drawings in greater detail, there is illustrated in FIGS. 1 and 2 a routing clamp assembly 10 for use securing a bundle 50 of elongate members to various points spaced along a truck frame. The routing clamp assembly 10 includes an L-shaped extension element 12, which may be flat bar stock having parallel planar surfaces made of steel or other inflexible material, having a short mounting leg 14 including a hole 46 for mounting the extension element 12 in a conventional manner to a truck frame rail partially shown at 15. For greater flexibility in vertically positioning the bundle 50 relative to the frame rail 15, the hole 46 can be slotted along the length of the leg 14 as shown in FIG. 1. Integrally connected to the leg 18 is a longer strap engaging leg 16 which is provided with a plurality of parallel transverse slots 18 therein as best shown in FIG. 2.

A strap member 17, preferably a conventional cable tie made of high impact, ultraviolet stabilized, nylon % material by Tyton Corporation of Milwaukee, Wis., extends through one of the slots 18 wraps around the bundle 50 of elongate members and is passed back through another of the slots 18 laterally separated from the first slot by the desired width of the bundle 50. The free end of the cable tie 17 is passed through the conventional keeper 19, such as that disclosed in U.S. Pat. No. 5,112,013, at least a portion of which is integrally formed on the end of the cable tie and the cable tie is placed under tension to pull the bundle against the extension. It is helpful during assembly, although unnecessary thereafter, that the keeper 19 is larger than the slots 18 so that the keeper end does not become disengaged from the end slot while the free end is being wrapped around the bundle and threaded through the other slot before engaging the keeper bore.

THE EMBODIMENT OF FIGS. 3–5

Figure 5:
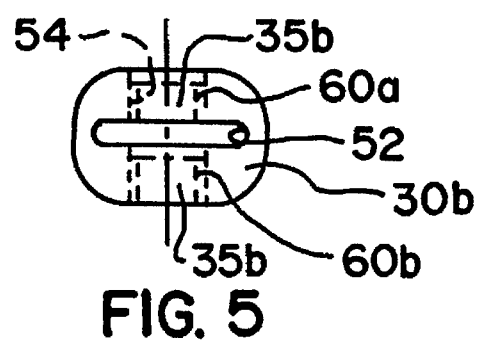
FIG. 5 is a side view of the keeper used on the assembly FIG. 3.

A first alternate embodiment 10b of the invention is presented in FIGS. 3–5. In this embodiment, all parts which are the same as the previous embodiment carry the same number. In this respect, the mounting extension element 12 is substantially the same as the previous embodiment. However, a plastic strap member 20 of nylon material having indentations 22 formed along a surface thereof is provided having at one end 24 a stop member 26 formed thereon having dimensions greater than those of the slots 18 in the leg 16 of the extension element 12, with the strap member 20 fitting easily through the slots 18 in the leg 16.

A multiple tooth keeper 30b having a plurality of aligned teeth 35b is slidingly disposed on the extension element 12 in alignment with one of the slots 18 therein. As shown in FIG. 5, the keeper 30b is a cylindrical structure having a slot 52 centrally located therein, which engages completely about the leg 16 of the extension element 12. A second slot 54 at a right angle to the slot 52 is also provided, the slot 52 having dimensions approximating those of the slots 18 in the leg 16.

Because upper and lower engagement areas 60a and 60b, respectively, have been formed on the keeper 30b, as related to the position of the leg 16, two teeth 35b may be provided which are aligned and spaced apart so as to engage two consecutive indentations 22 in the strap 20, as best shown in FIG. 3.

In use, the keeper 30b is fed over free end 48 of the leg 16 and pushed toward the leg 14. The free end 32 of the strap 20 is then fed through a chosen slot 18 within the leg 16, preferably one adjacent the free end 48 thereof, until the enlarged end 26 of the strap 20 abuts against the lower side of the leg 16. Then, the bundle 50 to be held by the clamp assembly 10b is placed over the leg 16, at a chosen position adjacent the strap 20. Next, the keeper 30b is slid over a slot 18 in the leg 16 which is adjacent an edge of the bundle 50 opposite the strap 20.

The free end 32 of the strap 20 is then brought over the bundle 50 and fed downwardly, wrapping around the bundle 50, through the slot 18 in the leg 16 and feeding first into the upper engagement area 60 of the slot 52 in the keeper 30b, then through the slot 18 in the leg 16, and then through the lower engagement area 60b of the slot 52. As the free end 32 of the strap 20 is pulled downwardly beneath the leg 16 and keeper 30b to be tightened against the bundle 50, and because the tooth 35b are downwardly directed, consecutive indentations 22 in the strap 20 engage the teeth 35b while preceding indentations 22 disengage, until the strap 20 is tightly engaged about the bundle 50 without crushing same.

Figure 9:
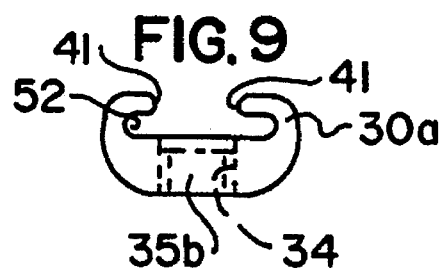
FIG. 9 is a side view of a single tooth keeper.

A variation 30a of the keeper 30b is shown in FIG. 9. Here, the keeper is only the bottom half of the keeper 30b and consequently includes a single tooth 35b. The upper portion of the keeper 30a includes ear portions 41 to partially define the slot 52 in which the leg 16 is received and which support the keeper 30a in depending relation from the extension element leg 16.

Figure 10:
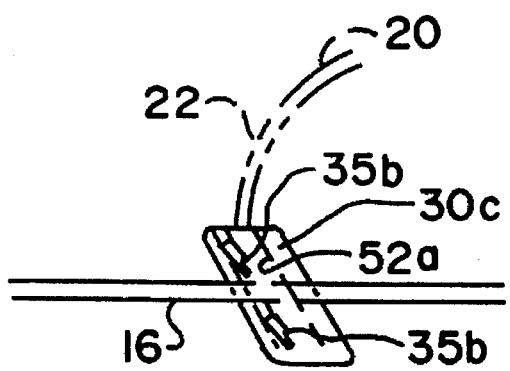
FIG. 10 is a perspective view of an angled double tooth keeper, shown engaging a free end of a strap to an extension element.

A further variation 30c of the keeper 30b is shown in FIG. 10. Here, the keeper 30c is similar to keeper 30b, but, rather than being rectangular in cross section, the keeper 30c is in the form of a parallelogram in cross section, with a strap receiving slot 52a thereof now lying at an angle acute to the leg 16 rather than being perpendicular thereto. Such angulation of the slot 52a creates a significantly increased locking pressure against the strap 20, which may be desired in certain circumstances.

THE EMBODIMENT OF FIGS. 6–9

A second alternate embodiment 10a of the invention is presented in FIGS. 6–9. In this embodiment, all parts which are the same as the previous embodiment carry the same number. In this respect, the mounting extension element 12 is substantially the same as the previous embodiment. However, a spring steel strap member 21 having a plurality of closely spaced openings 22 formed therein is provided having at one end 24 a stop member 26a formed thereon having dimensions greater than those of the slots 18 in the leg 16 of the extension element 12, with the strap member 21 fitting easily through the slots 18 in the leg 16.

Figure 7:
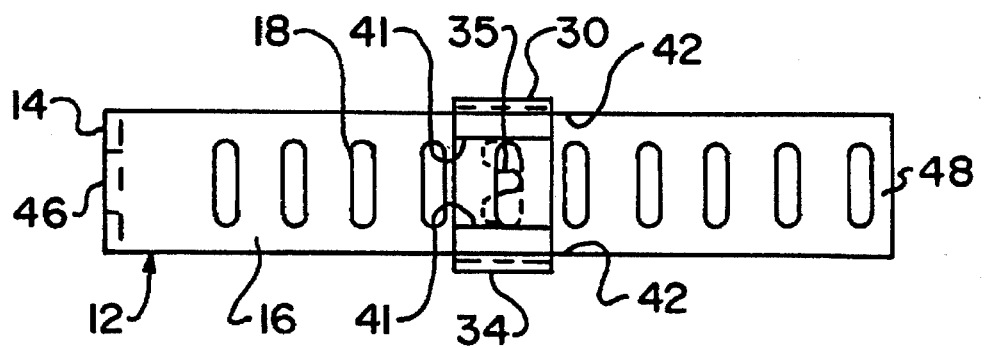
FIG. 7 is a top plan view of an extension element of the assembly of FIG. 6 showing the keeper engaged thereto.
Figure 8:
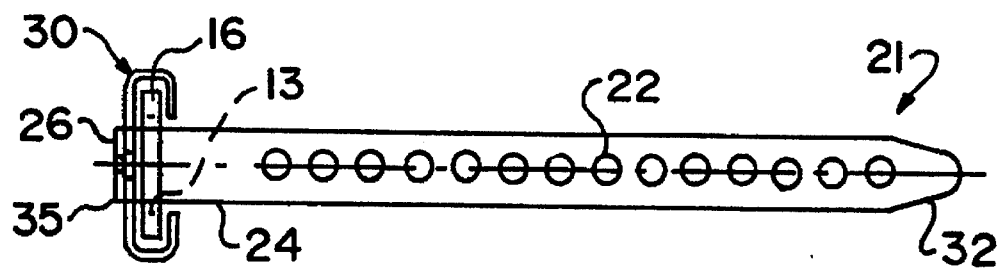
FIG. 8 is a top plan view of a strap of the assembly of FIG. 6 and shows an end of the strap including a stop member thereon engaged to the extension element.

As shown in FIG. 7, a toothed keeper 30 formed of spring steel is used to engage a free end 32 of strap member 21 to the leg 16 of extension element 12 and comprises a C-shaped element 30 having slot 34 therein within which a single tooth 35 is seen extending at a downward angle relative thereto and below the leg 16 at an approximately center position of the element 30, the tooth 35 being positioned to ensure engagement within one of the openings 22 in the strap 21. The tooth 35 is also seen to be centered within the slot 34 provided in the keeper 30, the slot 34 mimicking dimensions of the slots 18 in the leg 16 of the extension element 12.

Thus, when the keeper 30 is slid over the leg 16 in a manner to depend therefrom by means of inwardly deflected ends 41 of the C-shaped keeper 30, the ends 41 resting upon lateral edges 42 of the leg 16 to suspend the remainder of the keeper 30 beneath the leg 16, the slot 34 can be aligned with a chosen slot 18 in the leg 16, creating an open pathway through which the free end 32 of the strap 20 may be fed.

In use, the keeper 30 is fed over free end 48 of the leg 16 and pushed toward the leg 14, in a depending fashion as described above. The free end 32 of the strap 21 is then fed through a chosen slot 15 within the leg 16, preferably one toward the free end 48 of the leg 16. Then, the tubing or bundle 50 to be engaged by the assembly 10 is placed over the leg 16, at a chosen position between the mounting leg 14 and the strap 21. Next, the keeper 30 is slid over a slot 18 in the leg 16 which is adjacent an edge of the bundle 50 which is closest thereto. The free end 32 of the strap 21 is then brought over the bundle 50 and fed downwardly around the bundle 50, through the slot 18 in the leg 16 and on through the slot 34 in the keeper 30.

As the free end 32 of the strap 21 is pulled downwardly beneath the leg 16 and keeper 30, the openings 22 in the strap 21 snap into engagement with the tooth 35. As the strap 21 is tightened against the bundle 50, and because the tooth 35 is downwardly directed, consecutive openings 22 in the strap 21 engage the tooth 35 while preceding openings 22 disengage, until a point is reached where the strap 21 is tightly engaged about the bundle 50 without crushing same. When such point of engagement is reached, the opening 22 engaged to the tooth 35 is maintained engaged thereto by the angulation of the tooth 35 relative to the strap 21.

To disengage the strap 21, when desired, one merely pulls the free end 32 of the strap 21 downwardly at an angle away from the tooth 35, and then loosens the strap 21, while keeping the end 32 angled away from the tooth 35 to prevent the tooth 35 from snagging in the openings 22 in the strap 21.

As described above, the adjustable routing clamp assembly of the present invention provides a number of advantages, some of which have been described above and others of which are inherent in the invention. Also modifications to the invention may be proposed without departing from the teachings herein. Accordingly, the scope of the invention is only to be limited as necessitated by the accompanying claims.

What is claimed is:

1. In combination with a vehicle frame and a bundle of elongated members, an adjustable routing clamp assembly securing said bundle to said vehicle frame comprising:

an extension element having a first mounting leg attached to said vehicle frame and a second strap engaging leg extending away from said vehicle frame to an end, the strap engaging leg having a plurality of parallel slots disposed between said mounting leg and said end, said bundle being disposed perpendicular to said extension element and having a side adjacent a first of said slots;

an elongate flexible strap having a plurality of indentations therein along the length thereof, said strap penetrating through said first of said slots in said extension element, wrapping around said bundle, and penetrating a second of said slots disposed adjacent a side of said bundle opposite said side adjacent said first of said slots; and keeper means operatively associated with said strap for maintaining said strap in a tensioned condition drawing said bundle against said extension element said strap having a stop member at one end thereof which is larger than said extension element slots, said keeper means comprising a keeper element slidingly engaged on said strap engaging leg of said extension element and having a toothed bore therein disposed in alignment with said second of said slots, a tooth disposed within said bore below said second slot for engaging and retaining said strap in said bore.

2. A routing clamp assembly for use in securing a tubular structure in a chosen position to a vehicle frame, said assembly comprising:

an L shaped extension element having parallel planar surfaces and having a shorter mounting leg with a slotted bore therein for mounting to said frame and a longer strap engaging leg having a line of parallel slots disposed therealong;

an elongate plastic strap having a body portion passing through two laterally spaced slots to form a loop on one side of said extension element, said body portion having a line of spaced apart indentations therein;

a plastic keeper element operatively associated with said strap and having a toothed bore therein including at least one tooth of the bore engaging within one of said indentations in said strap when a free end of said strap is fed through said bore to maintain said strap engaged against backward pressure on said strap, and said strap having one free end and a second end having a stop member thereon which will not pass through said slots and said plastic keeper comprising a separate member from said strap slidingly engaged on said strap engaging leg, said bore being aligned with one of said slots in said strap engaging leg.

* * * * *